United States Patent [19]

Rogers et al.

[11] Patent Number: 5,547,133
[45] Date of Patent: Aug. 20, 1996

[54] MANUFACTURE PROCESS FOR GROUND OAT CEREAL

[76] Inventors: Lynn Rogers, 1536 Wavertree, Fullerton, Calif. 92631; Robert D. Maneval, 1735 - 34th St. SW. Unit B, Fargo, N. Dak. 58103; Daryl W. Bashor, Box 215, Baker, Minn. 56513; David J. Johnson, 4214 - 9th Ave. SW. #106, Fargo, N. Dak. 58103

[21] Appl. No.: 175,207

[22] Filed: Dec. 23, 1993

[51] Int. Cl.⁶ .................. B02C 9/00; B02C 9/04
[52] U.S. Cl. .................. 241/9; 241/13; 241/76; 241/159
[58] Field of Search .................. 241/9, 13, 69, 241/76, 157, 159

[56] References Cited

U.S. PATENT DOCUMENTS

| | | |
|---|---|---|
| 2,554,873 | 5/1951 | Musher . |
| 3,362,649 | 1/1968 | Odden .................. 241/9 |
| 3,620,760 | 11/1971 | Ver Steeg, Jr. et al. . |
| 3,640,728 | 2/1972 | Ronai et al. .................. 99/80 R |
| 3,640,729 | 2/1972 | Ronai et al. .................. 99/83 |
| 4,028,468 | 6/1977 | Hohner et al. . |
| 4,220,287 | 9/1980 | Boczewski .................. 241/9 |
| 4,551,347 | 11/1985 | Karwowski . |
| 4,565,708 | 1/1986 | Blake et al. . |
| 4,614,664 | 9/1986 | Karwowski . |
| 4,861,614 | 8/1989 | Seaborne . |
| 4,881,689 | 11/1989 | Lippuner et al. .................. 241/9 |
| 4,888,180 | 12/1989 | Wu . |
| 4,957,762 | 9/1990 | Finnerty et al. .................. 426/457 |
| 4,978,543 | 12/1990 | Finnerty et al. .................. 426/243 |
| 5,035,913 | 7/1991 | Sky .................. 426/619 |
| 5,100,062 | 3/1992 | Baltensperger et al. .................. 241/9 |
| 5,115,989 | 5/1992 | Satake .................. 241/7 |
| 5,158,237 | 10/1992 | Wellman .................. 241/10 |
| 5,192,028 | 3/1993 | Curran .................. 241/3 |
| 5,200,215 | 4/1993 | Slade et al. .................. 426/18 |
| 5,201,470 | 4/1993 | Baltensperger et al. .................. 241/13 |
| 5,269,469 | 12/1993 | Graenicher et al. .................. 241/6 |
| 5,303,870 | 4/1994 | Baltensperger et al. .................. 241/9 |

*Primary Examiner*—John Husar
*Attorney, Agent, or Firm*—Knobbe, Martens, Olson & Bear

[57] ABSTRACT

A ground oat-based cereal provides a nutritional, hot meal with improved flavor, textural taste, and keeping qualities. That is, the ground oat cereal maintains its consistency and heat over a longer period of time than conventional oatmeal. The oat-based cereal includes ground and sifted oat granules of which 27%–33% by weight have sizes greater than generally about 0.08 inches, and 67%–73% by weight have sizes ranging between generally about 0.04 inches and generally about 0.08 inches. Whole oat groats are roll cut and sifted to produce the oat-based cereal. The density of the oat portion of the cereal ranges between 28–34 lbs/cu. ft.

20 Claims, 3 Drawing Sheets

MANUFACTURE PROCESS FOR GROUND OAT CEREAL

BACKGROUND OF THE INVENTION

1. Field of the Invention

The present invention relates in general to a comestible product, and in particular to a manufacturing process to produce a cereal product.

2. Description of Related Art

Oat-based cereals, such as oatmeal, provide a rich source of nutrition. Oatmeal (i.e., thin flaked oats) is one of the most popular hot cereals and is usually convenient for consumers to prepare in just several minutes.

Conventional oatmeal, however, generally has poor keeping qualities. That is, it tends to become pasty if not eaten soon after cooking. It also loses its taste and consistency (i.e., texture, firmness, density) over time, becoming bland, mushy, and gummy. Further, oatmeal typically does not retain heat well and cools off quickly if not continually heated.

The poor keeping qualities of oatmeal makes it difficult to cook and serve in large quantities. Steam tables are usually required to maintain the heat of cooked oatmeal before serving; however, cooked oatmeal commonly loses its consistency within a half hour or so when placed in a steam table. The oatmeal also may significantly cool if several minutes elapsed between the time the oatmeal is placed in a bowl and the time it is served to a consumer, as is typically the case in a restaurant or hospital setting.

SUMMARY OF THE INVENTION

In view of the foregoing shortcomings and drawbacks associated with conventional oatmeal, a need exists for a hot oatmeal-like cereal which has improved heat retaining characteristics and keeping qualities.

An oat-based cereal produced in accordance with a preferred embodiment of the present invention provides a hot oatmeal-like cereal which has improved heat retaining characteristics and keeping qualities. It also possesses improved flavor and textual taste (that is, has more crunch and firmness than conventional oatmeal).

In accordance with one aspect of the present invention, an oat-based cereal comprises oat groat granules generally having roughen external surfaces. Most of the granules have a size larger than generally about 0.04 inches. The greatest part of the granules have sizes generally ranging from about 0.04 inches to about 0.08 inches. In a preferred embodiment, about 67%–73% by weight of the granules have sizes generally ranging from about 0.04 inches to about 0.08 inches.

According to another aspect of the invention, a method of manufacturing an oat-based cereal involves grinding oat groats into granules, the majority of which have sizes greater than generally about 0.04 inches, and separating the granules to into a coarse fraction and a fine fraction. The course fraction principally has granulation sizes of greater than generally about 0.023 inches. The granules are separated such that generally about 30% by weight are fine granules and generally about 70% by weight are course granules.

In accordance with another aspect of the present invention, a hot oat-based cereal is prepared by providing an oat-based cereal comprising ground oat groat granules having a granulation profile of generally about 27%–33% by weight on USS#10 and generally about 67%–73% by weight on USS#18. One part of the oat-based cereal is mixed with three parts boiling water, and the mixture is heated for about 5 minutes. The mixture is then left to stand covered at room temperature for about 2 minutes before consuming.

BRIEF DESCRIPTION OF THE DRAWINGS

These and other features of the invention will now be described with reference to a preferred embodiment of a grain based cereal produced in accordance with a preferred manufacturing process. The following drawings are used in connection with several examples of grinding and sifting steps involved in the preferred manufacturing process.

DETAILED DESCRIPTION OF A PREFERRED EMBODIMENT

Figure 1:
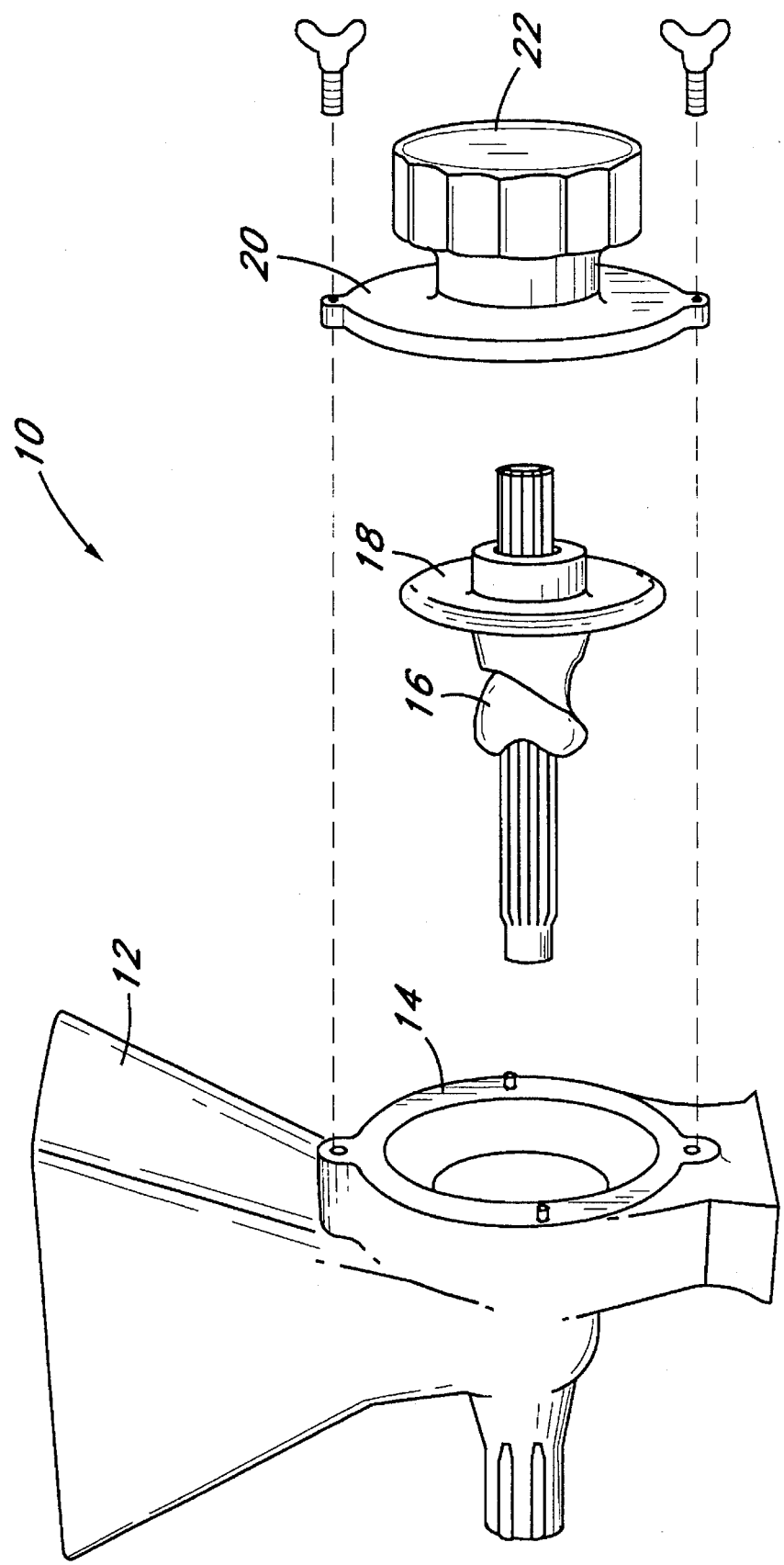
FIG. 1 is an exploded front perspective view of a burr milling device, the use of which is described in Example 1 below.

The following description of a preferred embodiment of the present invention uses oats as a model grain, and describes a milling process for producing a ground oat cereal. It is contemplated, however, that those skilled in the art will readily appreciate that the present invention is applicable to many other types of grain ( e.g., wheat, corn, rye, rice, buckwheat, barley, or like grain), and conventional milling processes used with a particular grain can be adapted in accordance with the present teaching to achieve the advantages of the present invention.

A. MILLING PROCESS

The process of manufacturing a ground oat cereal in accordance with the present invention principally involves the steps of grinding stabilized oat groats to a desired granulation size, which is discussed below, and sifting the processed stock to remove a fines fraction thereof. The fine fraction principally includes fines (i.e., flour) and shorts (i.e., small bran and germ particles).

1. Oat Groat Stock

Whole, stabilized oat groats are desirably used as the starting material in the present manufacturing process. The oats can be dehulled in any of a variety of conventional processes to extract the groat (i.e., the kernel including the bran, endosperm and germ) of the oat seed. For instance, the oats can be milled to remove the cellulosic hulls from the groats.

The groats also can be stabilized in any of a variety of conventional ways. For instance, the groats can be heat treated, either by steam treatment or kiln drying, for the purpose of deactivating (i.e., denaturing) enzymes in the oat groat. Shelf stability is reliant chiefly upon the suppression or avoidance of enzymatic or oxidative reactions which can occur in the grain.

Conventionally stabilized oat groats, as well as toasted oat groats and "moisture treated" oat groats are believed to result in a product of variable acceptability. Moisture treated oats have been found to produce a superior product in terms of taste and structural stability.

As used herein, "moisture treated" means a process of adding moisture to an oat groat to increase its moisture content level before the groat is stabilized through heat treatment in a kiln. Although this added moisture is lost during the heat treatment, it is believed that the structural stability and taste of the oat groats are improved as a result of this process. The moisture content by weight of moisture treated oat groats typically ranges between 8% to 10% after heat treatment, which is similar to that of oat groats which are heat treated in a conventional manner. Acceptable moisture treated oat groat stock is commercially available from Can-Oat Milling, Portage la Prairie, Manitoba, Canada.

2. Grinding Process

A variety of milling processes can be used to grind the oat groats into the desired granulation sizes. For instance, it is believed that attrition milling, burr milling, roll cut milling, pin milling, and similar well known milling methods can all be used in the present process to grind oats effectively. Two exemplary grinding processes are set forth below which were used in connection with the present processing method. As such, these examples are for illustration purposes only and are not meant to limit the invention in any way.

EXAMPLE 1

Burr Milling Process

A Kitchen-Aid®grain milling attachment to a Kitchen-Aid®mixer (model#KSM-90) was used to grind oat groats to a desired granulation size. FIG. 1 illustrates an embodiment of a grain mill 10 in an exploded perspective view.

The grain mill 10 included a hopper 12 which communicated with a grain mill body 14. The grain mill body 14 housed a rotatable grind worm 16. The grain mill body 14 also housed an adjustable burr disk 18 which was spaced from a stationary burr plate 20 by a variable gap spacing. The stationary disk 20 is housed within the grain mill body 14. An adjustment knob 22 controlled the gap spacing which was adjusted by know means. The gap spacing dictated the size of the oat groat granules.

Oat groats were placed in the hopper 12. A motor (not shown) rotated the grind worm 16 and burr 18 within the grain mill body 14. The grind worm 16 forced the oat groats toward the burr disk 18 and the rotating burr disk 18 ground the groats between the burr disk 18 and the stationary burr plate 20.

The proper gap setting was achieve by inspecting the granules of ground oat groats and adjusting the gap setting by turning the adjustment knob 22 until the desired granular size was obtained. This process involved a series of iterative steps. A desired amount of oat groats was ground after the proper gap setting was established.

EXAMPLE 2

Roll Cut Milling Process

A series of conventional roll stands also ground oat groats to the desired granular size. The grinding process involved a pre break stage, a first break stage and a second break stage.

A roll stand having smooth rollers was used to initially crack the oat groats open at the pre break stage. The roll stand included a pair of counter-rotating, 15 inch diameter, 40 inch long rollers. Both rollers rotated at 265 rpm (revolutions per minute). The rollers were spaced apart by a distance equal to about the nominal size of an oat groat in the particular process batch such that the majority of the groats were cracked open when passed between the rollers. On average, the gap setting was about 0.060 inches; however, the setting was adjusted for each process batch to insure that most of the oat groats were cracked open.

The first break stage employed a roll stand having a pair of counter-rotating 9 inch diameter, 24 inch long rollers. The rollers were corrugated and of the Getchell type with 24 corrugations/inch. The roller corrugations ran dull to dull.

Oat groats were feed into the roll stand between the corrugated rollers. The rollers rotated at different speed from each other. The speed differential between the roller was 2.7 to 1. The fast roller rotated at 695 rpm and the slow roller rotated at 262 rpm. It was understood, however, that the speed of the rollers could have been varied over a wide range. The present example simply provides suitable speeds to properly grind the oats.

The gap setting between the rollers was adjusted to obtain approximately the desired granulation size of the product. The processed stock was inspected and the gap setting was adjusted through a series of iterative steps until the desired granulation size was achieve. Although the proper gap setting varied from batch to batch, on average the gap setting equaled about 0.035 inches.

Oat groats feed between the rollers were torn and sheared to produce granules of approximately the desired size. The speed differential between the rollers caused the rollers to shear the oats, in addition to crushing the oats. The first break stage did most of the grinding of the oat groats in this exemplary process.

The second break finished the stock after it was sifted subsequent to the first break stage. (An exemplary sifting process is described below in detail in Example 3). The second break employed a roll stand having a pair of counter-rotating 9 inch diameter, 24 inch long rollers. The rollers were corrugated and of the Getchell type with 28 corrugations/inch. The rollers ran dull to dull.

Ground stock (e.g., material over a #80 stainless steel sieve, as discussed in Exhibit 3) were feed between the corrugated rollers of the roll stand at the second break stage. The rollers rotated at different speed from each other. The speed differential between the roller was about 2.7 to 1. The fast roller rotated at 695 rpm and the slow roller rotated at 262 rpm.

The gap setting between the rollers was adjusted to obtain the desired granulation sizes. Similar to the adjustment step of the first break stage, the processed stock at the second break stage was inspected and the gap setting was adjusted through a series of iterative steps until the desired granulation size was achieve. Although the proper gap setting varied from batch to batch, on average the gap setting equaled about 0.030 inches.

Thus, the foregoing examples illustrated that both burr milling and roll cut milling can be effectively used in the grinding process involved in the present invention.

3. Separation Of Fine And Coarse Fractions

Separation of the ground stock into course and fine fractions can be achieve in any of a variety of ways which will be well known to one of skill in the art. For instance, sieves, vibrator screens, centrifugal separators, cyclones or the like are believed equally effective in the separation of the fine fraction and coarse fraction of the stock.

As used herein, "the coarse fraction" is the fraction of ground oat granules which fall within the desired granulation size ranges specified below, and "the fine fraction" is the balance of particles having a size smaller than the minimum acceptable particle size. The fine fraction principally comprises flour (fine endosperm particles) and shorts (small particles of bran and germ).

The following example provides an exemplary separation process which can be used with the grinding process of Example 2. As such, this example is for illustrative purposes only and is not intended to limit the invention in any way.

EXAMPLE 3

Sifting Process

Figure 2:
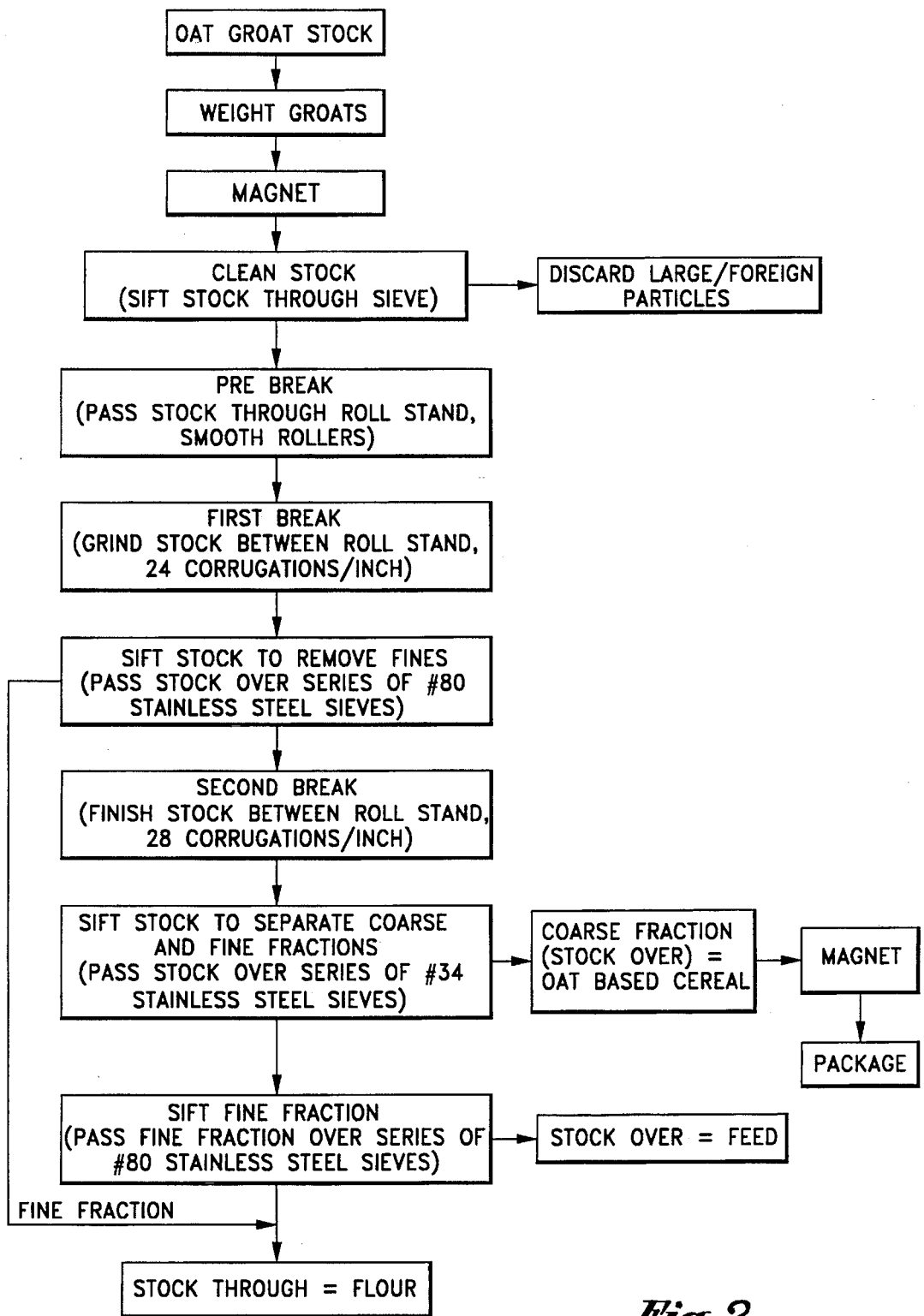
FIG. 2 illustrates a flow diagram of the milling steps described in Examples 2 and 3. The manufacturing process steps diagramed by FIG. 2 are intended to illustrate an exemplary manufacturing process, and are not intended to limit the present invention in any way.
Figure 3:
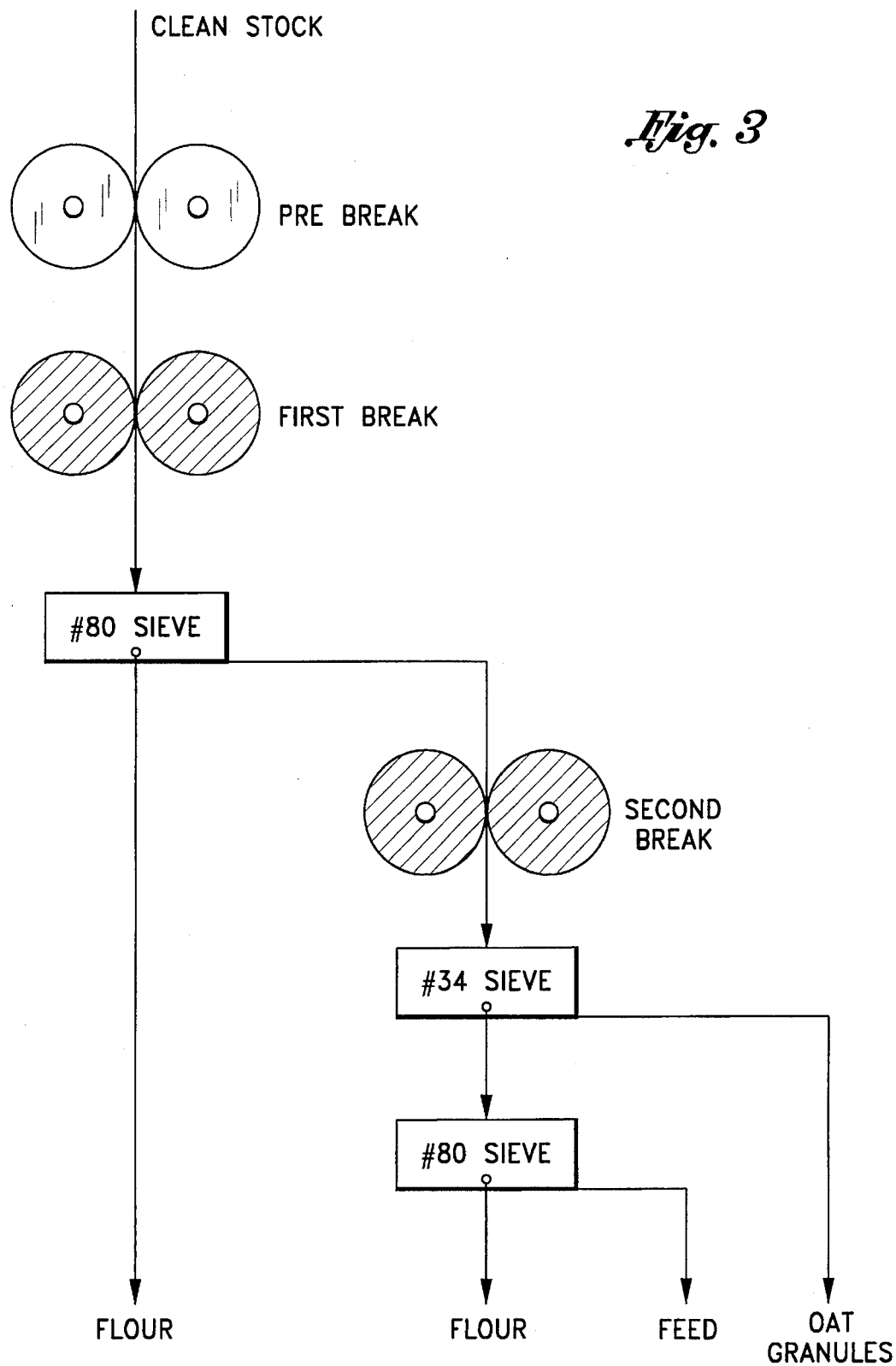
FIG. 3 is a schematic flow diagram illustrating the grinding and sifting apparatus components of a preferred embodiment of the present invention which can be used with the manufacturing process steps diagramed in FIG. 2. The grinding and sifting apparatus components illustrated in FIG. 3 are intended to illustrated an exemplary manufacturing apparatus, and are not intended to limit the present invention in any way.

In connection with the grinding process of Example 2, the present example of a separation process involved a series of sifting steps interposed between the various grinding stages of Example 2. FIG. 2 illustrates a flow diagram of the performed grinding and sifting process steps, as well as their interrelation.

With reference to FIG. 2, a first sifting step was performed between the first break stage and the second break stage in order to separate fines from the stock. The first sifting process involved passing the stock over a series of sieves. Stainless steel sieves were used to insure the quality and purity of the stock, as known in the art. The series of screens included six (6) #80 stainless steel sieves. Each #80 stainless steel sieve had screen openings generally equal to about 0.0088 inches, as established by industry standards.

As illustrated by the process diagram of FIG. 2, the stock which passed over the sieves proceeded to the second break stage. The fine fraction of the stock which passed through the sieves separated from the stock. The flour stock was further processed to form flour by additional conventional processes. It is contemplated, however, that the fine fraction byproduct of this process can also be used in other known products or be disposed; however, use of the fines as flour stock improved the cost efficiency of this process as essentially the entire oat groat was converted into one useful product or another, such as, for example, ground oat cereal, flour, and feed, as discussed below.

The present example of the separation process also involved a second sifting stage performed after the stock passed through the second break. The second sifting stage first involved separating the coarse fraction (i.e., the product) from the fine fraction. For this purpose, the stock passed over a series of sieves. Again, stainless steel sieves were used to maintain the quality and purity of the stock. The series of sieves included two (2) #34 stainless steel sieves. Each #34 stainless steel sieves had a screen opening generally equal to about 0.0232 inches as set by industry standards.

During the second sifting stage, about 30% by weight of the stock sifted through the screens as the fine fraction. The balance of the stock (about 70% by weight) remained on the sieves. Thus, the grinding process of Example 2 yielded a ratio by weight between the coarse fraction and the fine fraction on the order of generally about 7 to 3.

With reference to FIG. 2, the stock over the sieves was removed and formed the product. That is, all stock which remained on the #34 stainless steel sieves was extract as the final ground oat product. The fine fraction of the stock which passed through the sieves was separated further.

As FIG. 2 diagrams, the fine fraction was passed over a series of smaller screens to separate the fine fraction into feed stock and flour stock. As mention above, although the present example formed feed and flour as byproducts of the present process, it should be understood that other types of byproducts currently known or later developed can be formed from the fine fraction as well.

In the present exemplary process, the fine fraction passed over a series of four (4) #80 stainless steel sieves, each sieve having screen openings equal to about 0.0088 inches. The fraction over the sieves formed feed stock. The fraction through the sieves constituted flour stock. The flour stock was processed further through conventional processes to form common flour, as known in the art.

4. Pre-Milling Procedure

The present milling process desirably includes several pre-milling steps to ensure the quality of the stock and to monitor the efficiency of the milling procedure, in addition to the principal grinding and sifting steps discussed above. FIG. 2 diagrams an exemplary pre-milling process which can be used before the grinding procedure of Example 2.

With reference to FIG. 2, the pre-milling process includes the step of weighing the stock to determine the amount of groats to be processed in a milling batch. The oats can be weighed on a scale bin or by other conventional means.

From a scale bin, the oats pass to an inspection station to determine whether the stock includes any metal objects. The inspection station desirably includes a metal detector for this purpose. Metal objects are removed from the stock before further processing.

The stock is also cleaned to remove large and/or foreign particles. In an exemplary process, the stock is passed over a sieve which has a screen spacing of sufficient size to permit the oat groats to fall through while maintaining larger sized particles over the screen. Stock and objects remaining on the screen are discarded. The sifter involved with this process includes a #6 stainless steel sieve.

The stock which passes through the first sieve falls on to a second sieve to separate small foreign material and pieces of oats from the stock. For this purpose, in an exemplary process, the second sifter includes a #18 stainless steel sieve.

5. Post Milling Process

The milling process desirably includes several post milling steps as well. With reference to FIG. 2, the ground oat product which remains after sifting is desirably inspected for the presence of foreign metal objects. Again, a metal detector can be used to determine whether the ground oat produce includes any metal pieces. Metal pieces desirably are removed before the stock proceeds to packaging.

The ground oat product can be packaged in a variety of different containers known to the industry. For instance, the ground oats can be packed in sleeve bags (either paper or plastic) or round containers. The containers also can be of various sizes, such as, for example, industrial, bulk or individual consumer sizes.

B. GROUND OAT PRODUCT

The above-describe process for grinding and separating oat groats produces granular particles of groats which generally have roughen exterior surfaces. Each granule also tends to have a unique shape. The granular particles vary in size and are significant larger than comminuted oat particles which constitute flour.

At least 90% of the granules of ground oat groats have a size larger than generally about 0.04 inches. The greatest part of the granules have a size generally ranging between about 0.04 inches to about 0.08 inches.

The following example specifies the granulation profile of products produced by the grinding and separating steps of Examples 2 and 3, as conventionally represented by a percent weight distribution within standard size ranges.

EXAMPLE 4

Granulation Profile

A sample of the product was tested for granulation sizes by a conventional Rotap method. The following table summarizes the results of several samples of product produced in accordance with the present manufacturing method which were Rotap tested to determine the granulation profile of the product.

TABLE 1

| Granulation Size Distribution-Rotap Two Minutes | |
| --- | --- |
| Granulation | Percent Distribution |
| On USS # 10 Sieve | 25–35% |
| On USS # 18 Sieve | 65–75% |
| On USS # 30 Sieve | 5% maximum |
| On USS # 60 Sieve | 3% maximum |
| Through USS # 60 Sieve | 2% maximum |

It is preferred that the product has a granulation profile of generally about 27–33% by weight on USS #10 and generally about 67–73% by weight on USS #18, with about 30% by weight on USS #10 and about 70% by weight on USS #18 being nominal. It is also desired, as indicated by Table 1, that the ground oat granules contain no more than 5% by weight of the granules of sizes which pass through a USS #18 screen. Of this 5%, no more than 3% by weight of the granules should pass through a USS #60 screen and no more than 2% by weight should pass through the USS #60 screen.

The overall density of the ground oat cereal which has the above granulation profile is generally on the order of about 28 to 34 pounds per cubic foot (lbs./cu. ft.). It is preferred that the overall density of the product equal about 31 lbs./cu. ft.

The moisture content of the cereal preferably does not exceed 11.5% by weight, at the end of the milling process for storage stability. It is noted that a small percent of ambient moisture is absorbed by the oat groats during the grinding process.

Granules of oat groats formed by the above-described grinding process generally hold heat better than conventional flaked or rolled oats, as well as provide a different taste and a different texture within the palate. The ground oat granules have a "nut-like" taste and a crunchy firmness after cooking.

Removal of fines (i.e., fine particles of endosperm) and the shorts (i.e., fine particles of bran and germ) enhance the keeping qualities of the oat-based cereal. Specifically, with the fines removed, the oat-based cereal is less likely to become pasty.

Although the ground oat cereal so far has been described as mainly consisting of ground oat groats, it is contemplated that the product can include other additives, such as, for example dried fruit (e.g., raisins, apples, etc.), flavoring or spices (e.g., cinnamon or honey), and/or other grain products. Thus, as used herein, "oat-based cereal" refers to a cereal which comprises ground oat groats in accordance with the present invention and which may or may not include other added comestible items.

C. PREPARATION OF HOT OAT CEREAL

The ground oat cereal desirable is served hot. To prepare the hot oat cereal, one part ground cereal is mixed with three parts water. The oat/water mixture is cooked for several minutes, desirably 5 minutes, at medium heat, and then left standing for an addition couple of minutes.

In accordance with an exemplary preparation process, 1 cup of water is brought to a boil. One-third (⅓) cup of ground oats is added to the boiling water. Salt can be added to the mixture if desired. The mixture is then cooked and left standing covered. These proportions serve 2–½ cups of hot ground oat cereal.

It is noted that more water is used with the ground oat cereal than is used with conventional rolled oat cereal. The ground oats absorb more water than the rolled oats which is believed to contribute to their ability to retain heat more effectively than rolled oats. The density of the cook oats is also believed to contribute to the improved heat retention characteristic.

Although this invention has been described in terms of a certain preferred embodiment, other embodiments apparent to those of ordinary skill in the art are also within the scope of this invention. Accordingly, the scope of the invention is intended to be defined only by the claims which follow.

What is claimed is:

1. A process of producing an oat-based cereal comprising the steps of:

cracking open oat groats by passing said oat groats through a first pair of counter-rotating rollers, said rollers having smooth surfaces and being spaced apart by a distance substantially equal to the nominal thickness of an oat groat in a process batch, said rollers having a 1 to 1 speed differential;

grinding said oat groats into granules of a size generally about 0.04 inches or larger by passing said oat groats through a second pair of counter-rotating rollers, said rollers having corrugated surfaces and being spaced apart by a distance of generally about 0.035 inches, said rollers having a 3 to 1 speed differential;

sifting said stock passed through said second rollers over a first series of screens of generally about 0.0088 inch openings;

finishing said stock by passing said stock through a third pair of counter-rotating rollers, said rollers having corrugated surfaces and being spaced apart by a distance of generally about 0.030 inches, said rollers having a 3 to 1 speed differential; and sifting said oat groat stock from said third pair of rollers through a a second series of screens of generally about 0.023 inch openings to separate said oat groats into coarse and fine fractions, said coarse fraction principally having granular sizes generally ranging from about 0.04 inches to 0.08 inches and comprising about 70% of the oat groat produce processed through said third rollers.

2. The process of claim 1 additionally comprising the steps of dehulling the oats to separate the hull from the oat groat and heat treating the oat groat to stabilize the oat groat.

3. The process of claim 2, wherein said oat groats are treated with moisture to increase the moisture content of the oat groats before heat treating.

4. The process of claim 1, wherein said second and third rollers have corrugations on the order of generally about 20–30 corrugations per inch.

5. The process of claim 1 additionally comprising the step of sifting the fine fraction into feed stock and flour stock.

6. The process of claim 5, wherein said step of shifting said fine fraction involves passing said fine fraction through a a third series of screens of generally about 0.0088 inch openings.

7. The process of claim 6, wherein said fine fraction is passed through at least a series of four USS #80 screens of said third series of screens.

8. The process of claim 1, wherein said stock passed through said second rollers is sifted through a least six USS #80 screens of said first series of screens.

9. The process of claim 1, wherein said stock passed through said third rollers is sifted through a least two USS #34 screens of said second series of screens.

10. The process of claim 1, wherein a first roller of said second pair of rollers is rotated at about 265 rpms and the second roller of said second pair of rollers rotates at about 695 rpms.

11. The process of claim 1, wherein a first roller of said third pair of rollers is rotated at about 265 rpms and the second roller of said third pair of rollers rotates at about 695 rpms.

12. The process of claim 1 additionally comprising weighing the oat groat stock before cracking open the stock.

13. The process of claim 1 additionally comprising inspecting the oat groat stock for foreign metal objects and cleaning the stock to remove large and foreign particles before cracking open the stock.

14. The process of claim 13, wherein inspecting involves passing the stock through a detection station which includes a metal detector.

15. The process of claim 13, wherein cleaning the stock involves passing the stock through a USS #6 sieve to remove large and foreign particles.

16. The process of claim 13, wherein cleaning the stock includes passing the stock through a U.S. Standard #18 sieve to separate small foreign material and pieces of oats from the stock.

17. The process of claim 1 additionally comprising inspecting the coarse fraction for metal objects.

18. The process of claim 13 additionally comprising packaging the coarse fraction.

19. The process of claim 1, wherein finishing and sifting the ground oat groats stock involves selecting the roller spacing and sieve size such that the produced coarse fraction has a granulation profile of generally about 25%–35% by weight on a USS #10 screen and generally about 67%–73% by weight on a USS #18 screen.

20. The process of claim 1, wherein said sifting of the finished ground oat groats produces no more than about 5% by weight in said coarse fraction of oat granules which passes through a USS #30 screen.

* * * * *